United States Patent
Ho et al.

(10) Patent No.: US 8,364,952 B2
(45) Date of Patent: Jan. 29, 2013

(54) METHODS AND SYSTEM FOR A KEY RECOVERY PLAN

(75) Inventors: Shuk Yee Ho, Mountain View, CA (US); Christina Fu, Mountain View, CA (US); Chandrasekar Kannan, Mountain View, CA (US); Nang Kon Kwan, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1054 days.

(21) Appl. No.: 11/446,958

(22) Filed: Jun. 6, 2006

(65) Prior Publication Data
US 2008/0022086 A1    Jan. 24, 2008

(51) Int. Cl.
H04L 29/06    (2006.01)

(52) U.S. Cl. .......... 713/155; 713/168; 713/180; 380/30; 380/277; 380/286

(58) Field of Classification Search ................... None
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |
| 5,991,411 A | 11/1999 | Kaufman et al. |
| 5,991,882 A | 11/1999 | O'Connell |

(Continued)

FOREIGN PATENT DOCUMENTS

| | | |
|---|---|---|
| WO | 9724831 | 7/1997 |
| WO | 0048064 A1 | 8/2000 |

(Continued)

OTHER PUBLICATIONS

ATM and Credit Card Notification, Feb. 2005 (internet archive) pp. 1-2 www.thereareplaces.com/infgdes/money.atmnotif.htm.

(Continued)

*Primary Examiner* — Shewaye Gelagay
(74) *Attorney, Agent, or Firm* — Lowenstein Sandler PC (57) ABSTRACT

Methods, systems and computer readable mediums are provided for recovering subject keys and/or certificates for a token. A unique identifier associated with the token is obtained. The token is associated with subject keys and with a first status of statuses, the statuses including a lost status state and an other status state. In response to the token being in the lost status state, a key recovery plan is determined to recover at least one of the subject keys and the certificates associated with the token.

17 Claims, 6 Drawing Sheets

U.S. PATENT DOCUMENTS

| | | |
|---|---|---|
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,396,929 B1 * | 5/2002 | Chandersekaran et al. ..... 380/286 |
| 6,397,329 B1 * | 5/2002 | Aiello et al. ................... 713/155 |
| 6,483,920 B2 * | 11/2002 | Pinkas ............................ 380/286 |
| 6,490,680 B1 | 12/2002 | Scheidt et al. |
| 6,502,108 B1 | 12/2002 | Day et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 | 5/2004 | Hagan et al. |
| 6,760,752 B1 | 7/2004 | Liu et al. |
| 6,804,687 B2 | 10/2004 | Sampson |
| 6,819,766 B1 | 11/2004 | Weidong |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 * | 4/2005 | Brittenham et al. .......... 713/173 |
| 6,898,605 B2 | 5/2005 | Constantino |
| 6,898,714 B1 | 5/2005 | Nadalin et al. |
| 6,931,133 B2 | 8/2005 | Andrews et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 | 4/2008 | Wang |
| 7,374,099 B2 | 5/2008 | de Jong |
| 7,386,705 B2 | 6/2008 | Low et al. |
| 7,437,757 B2 | 10/2008 | Holdsworth |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,571,321 B2 | 8/2009 | Appenzeller et al. |
| 7,602,910 B2 | 10/2009 | Johansson et al. |
| 7,702,917 B2 | 4/2010 | Tevosyan et al. |
| 7,769,996 B2 | 8/2010 | Randle et al. |
| 7,822,209 B2 | 10/2010 | Fu et al. |
| 7,860,243 B2 | 12/2010 | Zheng et al. |
| 2001/0008012 A1 | 7/2001 | Kausik |
| 2001/0036276 A1 | 11/2001 | Ober et al. |
| 2001/0054148 A1 | 12/2001 | Hoornaert et al. |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1 | 8/2002 | Gien et al. |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2002/0188848 A1 | 12/2002 | Buttiker |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0056099 A1 | 3/2003 | Asanoma et al. |
| 2003/0075610 A1 | 4/2003 | Ong |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 * | 6/2003 | Aull et al. ...................... 713/173 |
| 2003/0115468 A1 | 6/2003 | Aull et al. |
| 2003/0167399 A1 | 9/2003 | Audebert et al. |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 * | 5/2004 | Band ............................. 713/202 |
| 2004/0103325 A1 | 5/2004 | Priebatsch |
| 2004/0120525 A1 | 6/2004 | Miskimmin et al. |
| 2004/0144840 A1 | 7/2004 | Lee et al. |
| 2004/0146163 A1 * | 7/2004 | Asokan et al. ................. 380/277 |
| 2004/0153451 A1 | 8/2004 | Phillips et al. |
| 2004/0162786 A1 | 8/2004 | Cross et al. |
| 2004/0230831 A1 | 11/2004 | Spelman et al. |
| 2005/0022123 A1 | 1/2005 | Costantino |
| 2005/0033703 A1 | 2/2005 | Holdsworth |
| 2005/0109841 A1 | 5/2005 | Ryan et al. |
| 2005/0114673 A1 | 5/2005 | Raikar et al. |
| 2005/0119978 A1 | 6/2005 | Ates |
| 2005/0123142 A1 | 6/2005 | Freeman et al. |
| 2005/0138386 A1 | 6/2005 | Le Saint |
| 2005/0138390 A1 | 6/2005 | Adams et al. |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0216732 A1 | 9/2005 | Kipnis et al. |
| 2005/0262361 A1 | 11/2005 | Thibadeau |
| 2005/0279827 A1 | 12/2005 | Mascavage et al. |
| 2005/0289652 A1 | 12/2005 | Sharma et al. |
| 2006/0005028 A1 | 1/2006 | Labaton |
| 2006/0010325 A1 | 1/2006 | Liu et al. |
| 2006/0015933 A1 | 1/2006 | Ballinger et al. |
| 2006/0036868 A1 | 2/2006 | Cicchitto |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 * | 8/2006 | Crichton et al. .............. 713/155 |
| 2006/0206932 A1 | 9/2006 | Chong |
| 2006/0208066 A1 | 9/2006 | Finn et al. |
| 2006/0226243 A1 | 10/2006 | Dariel |
| 2006/0291664 A1 | 12/2006 | Suarez et al. |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |

| | | |
|---|---|---|
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

FOREIGN PATENT DOCUMENTS

WO 2007096590 A1 8/2007

OTHER PUBLICATIONS

AMD Announces Specification for Open Platform Management Architecture, Feb. 28, 2005, pp. 1-2 http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS# v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition. 1996 John Wiley and Sons, pp. 480-481.

* cited by examiner

METHODS AND SYSTEM FOR A KEY RECOVERY PLAN

FIELD OF THE INVENTION

The present invention relates in general to a key stored on a token, and more specifically to plan for recovering a key.

BACKGROUND OF THE INVENTION

One of the problems in securing computer systems is the need for tamper-resistant storage of security information such as keys, digital certificates, identifiers, and related data. This functionality can be provided by a token, such as a smart card, a security token, a USB (universal serial bus) token, or the like. In addition, tokens can provide the ability to be replaced when the token or security becomes compromised.

One of the risks of relying on tokens is that they can be lost, forgotten, broken, or stolen. It is possible to issue a new key to replace the old key. Nevertheless, it is not necessarily desirable to invalidate the keys and replace the old token with a new token having new keys. For example, the user might still want to use the old keys to access computer resources, such as e-mail.

In any event, the token might simply be temporarily misplaced and not compromised, so it is not necessary to invalidate the keys for the token. When the user locates the token, the old key might be re-used.

A system can provide various actions which can be taken, such as generating a new token with the old keys, generating a new token with new keys, revoking certificates, generating new certificates, or similar. However, taking any one of these actions in certain situations can have undesirable consequences, such as further compromising security or rendering system resources inaccessible.

Therefore, to address the above described problems and other problems, what is needed is a method and system for providing a plan of actions which can be taken when a token is lost, forgotten, damaged, or stolen.

SUMMARY OF THE INVENTION

Accordingly, one or more embodiments of the present invention provide methods, systems and computer readable mediums for recovering subject keys and/or certificates for a token. A unique identifier associated with the token is obtained. The token is associated with subject keys and with a first status of multiple statuses, the statuses including a lost status state and an other status state. In response to the token being in the lost status state, a key recovery plan is determined to recover at least one of the subject keys and the certificates associated with the token.

Moreover, one or more embodiments provide methods, computer systems, and computer readable mediums that determine a key recovery plan to recover subject keys and/or certificates for tokens. A first unit obtains a status of a token, wherein the status is a first status of multiple statuses including a lost status state. A second unit associates the status with the token. A third unit, in response to the token being associated with the lost status state, associates a reason(s) with the token, wherein respective reasons have associated therewith respective actions to be performed for respective subject keys associated with the token. A fourth unit, in response to the token being in the lost status state, initiates the performance of the respective actions for the respective subject keys associated with the token.

Also, one or more embodiments provide methods, systems and computer-readable mediums for managing a subject key and/or certificate for a token. The embodiment(s) provides for interacting with a subject to indicate a first status of multiple statuses, the statuses including a temporarily lost state, a permanently lost state, and a destroyed state. Also, it provides for updating the first status of the token.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures.

DETAILED DESCRIPTION

In overview, the present disclosure concerns secure systems such as may be operated in connection with certifying and/or authenticating identifiers associated with users and/or computers and/or tokens. Such secure systems may be utilized in connection with other services such as communications, secured access, and/or telecommunications. Such secure systems can include computer systems which support the use of tokens to access independent data objects representing certificates, keys, security information, and related data, for example by providing end-user interfaces, managing keys, and providing authentication. More particularly, various inventive concepts and principles are embodied in systems, devices, and methods therein for planning the recovery of security information for a token.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to determine how keys, certificates, and other security information corresponding to a token will be recovered. A key recovery plan can be utilized to decide what action to perform. The plan can determine actions such as whether the keys should be recovered to the token, whether a new key should be issued, and/or whether certificates associated with the token should be revoked or retrieved. In addition, other actions can be taken to affect information associated with the token. The actions can be customized via plug-ins as desired so that different subjects can take customized actions.

Situations that can be addressed via a key recovery plan include a user getting a new token, a user using the wrong token, a user breaking their token, a user's token being stolen, a user permanently losing their token, a user temporarily losing their token, and the like. Also, key recovery plan can address a changed situation, for example, a lost token that was found or determined to be stolen.

A token can be defined with a status of active, inactive, and lost. The key recovery plan can define how to deal with tokens which are lost. The reason a token is lost can be further defined, for example, temporarily lost, permanently lost, destroyed, key compromised, stolen, on hold, and/or the like. The key recovery plan can differentiate among the actions that can be taken by the status and the reasons associated with a particular token. In addition, because a token can be associated with multiple subject keys (such as a signing key, and an encryption key), certificates, and other security information, the actions that can be taken can be further differentiated by the keys, certificates and/or other security information. For example, when a particular token is assigned a lost status because it is broken, the actions specified for the signing key can be different from the actions for the encryption key and/or any other key.

Reference will now be made in detail to the accompanying drawings. Wherever possible, the same reference numbers will be used throughout the drawings to refer to the same or like parts.

Figure 1:
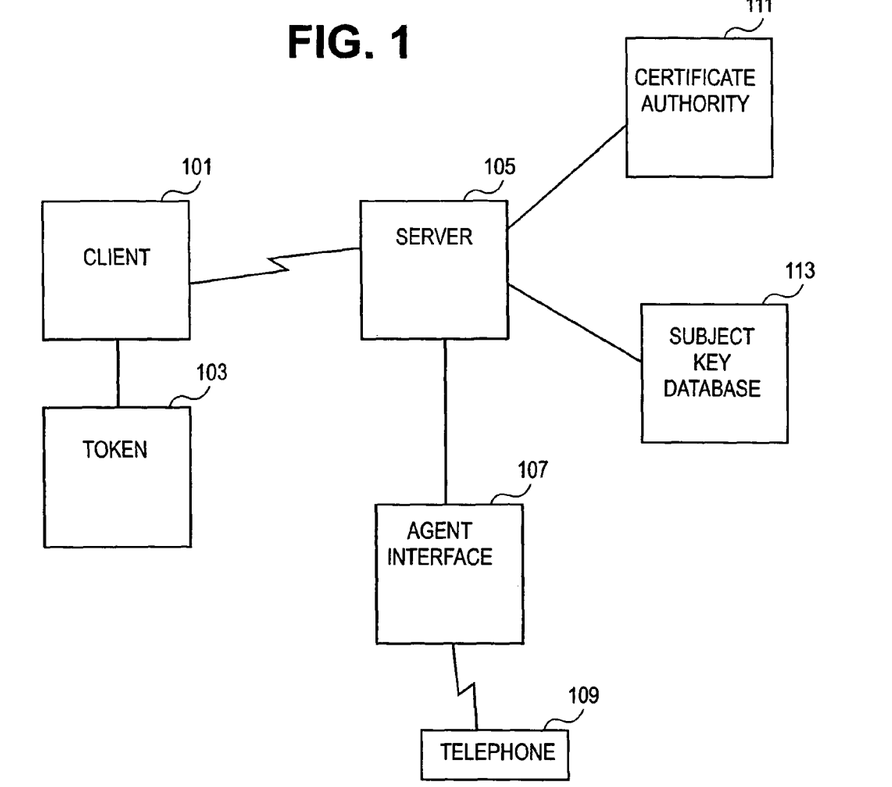
FIG. 1 illustrates a simplified and representative environment associated with a computer system.

Referring now to FIG. 1, a simplified and representative environment associated with a computer system will be discussed and described. The environment includes a client 101 such as for interfacing with a user and/or a token, a token 103, and a server 105 such as a token processing system. The server 105 can communicate with an agent interface 107, a certificate authority 111, and a subject key database 113. The agent interface 107 can be configured to support an agent in telephonically communicating with an end user, for example when the user's token is broken.

The server 105 may be a computing machine or platform configured to execute secure and/or unsecure (or open) applications through a multiple user operating system (not shown) in conjunction with the client 101. The server 105 may be implemented with server platforms as known to those skilled in the art from Intel, Advanced Micro Devices, Hewlett-Packard, and/or others. The server 105 may interact with the client 101 over the connection, for example a wireless or wired communication network, such as the Internet, a LAN (local area network), an intranet or similar. Also, the server 105 can interface with the subject key database 113, which stores subject keys corresponding to the tokens in a database which is separate from the tokens 103. The subject keys can also be stored on the token 103. The token information can be stored separately from the subject keys.

The client 101 can be a computing machine or platform (machine) configured to execute secure and/or open applications through a multi-user operating system. The client 101 may be implemented on a personal computer, a workstation, a thin client, a thick client, or other similar computing platform. The client 101 may be configured to interface with the token 103.

The agent interface 107 can be provided in connection with a computing machine or platform, as described above. The agent interface can interact with a user and can instruct the server 105 to perform various actions.

The certificate authority 111 can be provided in accordance with known techniques, for generating certificates. The certificate authority 111 can be responsible for issuing certificates.

The subject key database 113 can store the subject keys and token records/token information. A subject key is a key for a subject, that is, a user, device, or specific organization. Subject keys include, for example, a signing key, and an encryption key. A subject key is to be distinguished from a certificate. Subject keys can be associated with a particular token 103. Typically, the token 103 is associated with a unique identifier that is known to the server 105. Accordingly, embodiments can provide that the respective subject keys associated with the token include a signing key and an encryption key. It is anticipated that subject keys will be stored in encrypted form, and that the various actions will be programmed appropriately to access the subject keys.

Figure 2:
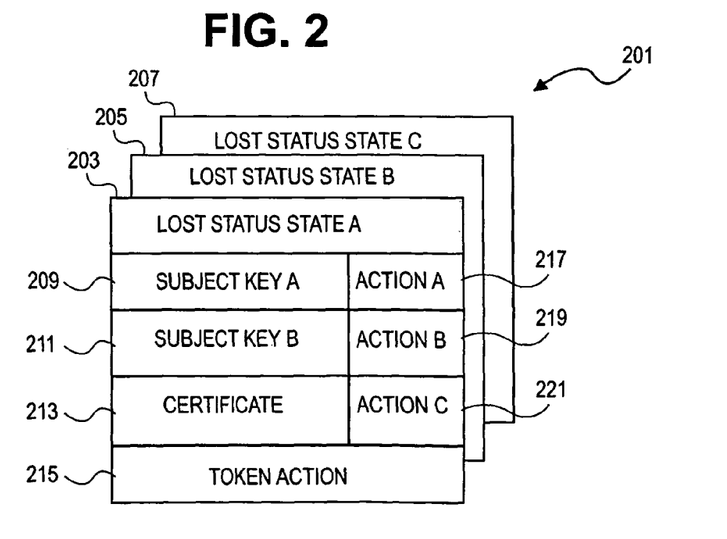
FIG. 2 is a diagram illustrating a simplified key recovery plan.

Referring now to FIG. 2, a diagram illustrating a simplified key recovery plan 201 will be discussed and described. The key recovery plan 201 includes lost status states, represented in the illustration by lost status state A 203, lost status state B 205, and lost status state C 207. Lost status states can include, for example, broken, temporarily lost, and/or permanently lost, although these denominations are intended to indicate different actions to be taken by a key recovery plan. A lost status state can have subject keys associated with it, such as the illustrated subject key A 209 and subject key B 211. In embodiments, the subject keys can be a signing key, and/or an encryption key. In the illustrated example, the subject keys each have an action associated with it, such as action A 217 and action B 219. Also, the lost status state can have one or more certificates 213 associated with it. An action, such as action C 221, can be associated with the certificate 213. Further, the lost status state can have a token action 215 associated with it, to perform actions on security information associated with the token.

When a token is placed into a particular lost status state, the appropriate lost status state 203, 205, 207 can be referenced and the actions which should be taken are determined. Actions 217, 219 for the keys for the particular token, actions 221 for the certificate, and token actions 215 can be taken as specified by the lost status state. The two subject keys 209, 211 illustrated here are intended to be representative of any number of subject keys. Accordingly, one or more embodiments can provide that the key recovery plan includes information identifying a subset of subject keys of the plurality of subject keys to be recovered and actions to recover the subset of subject keys in response to the lost status state. In embodiments, the actions can include, for example, recover subject key, retrieve certificate, or similar, as discussed further herein.

A variety of actions can be taken, as set out in the key recovery plan 201. While it is not the purpose of this discussion to set forth these actions in detail, such actions can include, for example, revoking a certificate on hold, generating one or more new subject keys, recovering one or more current subject keys, and/or initiating the process to issue a replacement token. It is anticipated that various actions can be plugged into the key recovery plan. Thus, the actions can be customized. Accordingly, one or more embodiments provides that the key recovery plan further includes information identifying actions to be performed on information associated with the token in response to the lost status state.

Various key recovery plans 201 can be provided. For example, a governmental entity may specify one key recovery plan, while a corporate entity may specify a different key recovery plan. Different tokens can be associated with different key recovery plans. Thus, the key recovery plan can be customized to a particular entity. Various embodiments can therefore include providing the key recovery plan, so that the key recovery plan can be changed or customized or associated with a particular subject.

The key recovery plan has been illustrated as a set of tables or records. The key recovery plan can alternatively be realized utilizing program code, flags, and/or a state table.

Figure 3:
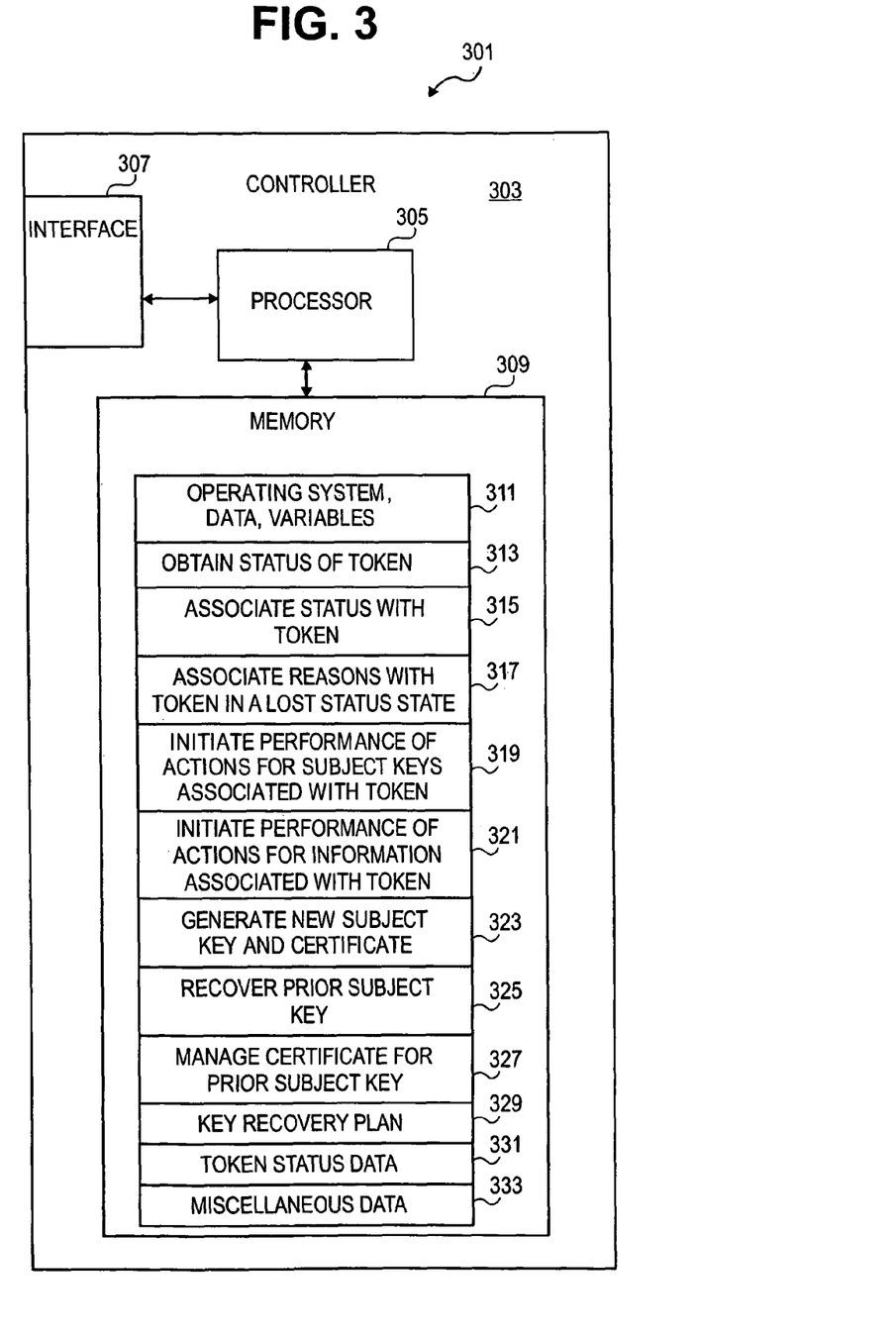
FIG. 3 is a block diagram illustrating portions of an exemplary server.

Referring now to FIG. 3, a block diagram illustrating portions of an exemplary server 301 will be discussed and described. The server 301 may include an interface 307 and one or more controllers 303. The controller 303 can include a processor 305 and a memory 309. Also, the server 301 can include optional peripherals such as a display (not illustrated) and/or various known input devices (not illustrated), such as a keypad, a computer mouse, a touchpad, a touch screen, a trackball, and/or a keyboard.

The processor 305 may comprise one or more microprocessors and/or one or more digital signal processors. The memory 309 may be coupled to the processor 305 and may comprise a read-only memory (ROM), a random-access memory (RAM), a programmable ROM (PROM), a flash memory, and/or an electrically erasable read-only memory (EEPROM). The memory 309 may include multiple memory locations for storing, among other things, an operating system, data and variables 311 for programs executed by the processor 305; computer programs for causing the processor to operate in connection with various functions such as obtaining the status of a token 313, associating the status with the token 315, associating reasons with the token when in a lost status state 317, initiating performance of actions for keys associated with the token 319, initiating the performance of actions for information associated with the token 321, generating a new subject key 323, recovering a prior subject key 325, managing a certificate for a prior subject key 327, and/or other processing; a location for a one or more key recovery plans 329; a location for token status data 331; and a location for miscellaneous other data 333 by the processor 305. The computer programs may be stored, for example, in ROM or PROM and may direct the processor 305 in controlling the operation of the server 303.

The processor 305 may be programmed for obtaining the status of a token 313. The status of the token can be obtained, for example, by interacting with a subject via the client, or by interacting with the agent interface, to specify the token's status, such as inactive, lost, or the like. The processor 305 thus can receive an indication of the status of the token.

The processor 305 can be programmed for associating the status with the token 315. The unique identifier associated with the token can be obtained, for example from the token itself, by verifying the subject, or from a communication to the processor 305. Thereby, the input status can be associated with the token.

The processor 305 can be programmed for associating reasons with the token when in a lost status state 317. There are various reasons that a token can be lost, and any reason can result in a different key recovery plan. For example, the reasons can include temporarily lost, permanently lost, and/or destroyed. When the token is associated with a lost status state, the token can further indicate a reason for the lost status state. For example, both the lost status state and the reason can be stored in associated with the token, or various lost status states can be associated with the token (such as lost-destroyed or the like).

The processor 305 can be programmed for initiating performance of actions for keys associated with the token 319, and for initiating the performance of actions for information associated with the token 321. For example, the actions in the key recovery plan can be initiated when the token changes from one state to another, or changes from one reason to another. Accordingly, embodiments can provide for, in response to the lost status state, changing the reason associated with the token, and initiating the performance of the respective actions for the respective reasons for the respective subject keys associated with the token.

It is anticipated that some of the actions, moreover, may be completed on a different server, such as the certificate authority, and accordingly the action can be initiated by transmitting an appropriate request to the different server. As another example, one of the actions for information associated with the token 321 can include generating a replacement token in accordance with known techniques, optionally where the replacement token is self-expiring. Such known techniques can include ordering a manual generation of the replacement token.

The processor can be programmed for performing actions specified by the key recovery plan 329. In the present example, the actions include subject key actions (generating a new subject key and certificate 323, recovering a prior subject key 325), and a certificate action (managing a certificate for a prior subject key 327). It is anticipated that the subject actions may include generating a new subject key to be associated with the token, retrieving a prior subject key associated with the token, and generating a new subject key to replace at least one subject key. A subject key action is performed on the token's subject key indicated in the key recovery plan 329. The subject key action may request a change to the subject key database (illustrated in FIG. 1). Accordingly, one or more embodiments can provide that the key recovery plan further includes: generating a new subject key and certificate to be associated with the token; recovering a prior subject key associated with the token; and/or managing a certificate associated with the prior subject key.

Accordingly, embodiments can facilitate, in response to the lost status state indicating that the token was destroyed, recovering at least one of the subject keys. Also, embodiments can facilitate, in response to the lost status state indicating that the token was compromised, generating a new subject key to replace at least one of the subject keys; and revoking a certificate associated with the subject key(s). Further, embodiments can facilitate, in response to the lost status state indicating that the token is on hold, generating a replacement token, and placing the token in an on-hold mode; wherein the replacement token can be self expiring, and wherein the certificates corresponding to the token are revoked. These actions can be provided by calls to known subroutines, tasks, or processes, and variations and evolutions thereof.

A certificate action is performed on the certificate corresponding to the token. It is anticipated that the certificate actions may include, by way of example, managing a certificate associated with the prior subject key, revoking a certificate associated with at least one of the subject keys, placing the token in an on-hold mode, and revoking all certificates associated with the token. The certificate action may request a change to the certificate corresponding to the token, as in known techniques for interacting with a certificate authority.

Accordingly, embodiments can provide a computer system that determines a key recovery plan to recover subject keys and/or certificates for tokens. The computer system can include a first unit to obtain a status of a token, wherein the status is a first status of plural statuses including a lost status state; a second unit to associate the status with the token; a third unit, in response to the token being associated with the lost status state, to associate one of plural reasons with the token, wherein respective reasons have associated therewith respective actions to be performed for respective subject keys associated with the token; and a fourth unit, in response to the token being in the lost status state, to initiate the performance of the respective actions for the respective subject keys associated with the token.

Also, the processor 305 can connect to the token (not illustrated) via the interface 307. Known techniques can be utilized to establish and maintain a connection. Such a connection optionally can be a secure connection, for example utilizing cryptographic techniques. The token can be connected locally or remotely to the interface 307.

It should be understood that various logical groupings of functional blocks are described herein. Different realizations may omit one or more of these logical groupings. Likewise, in various realizations, functional blocks may be grouped differently, combined, or augmented. Furthermore, one or more functional blocks including those identified herein as optional can be omitted from various realizations. For example, the present description may describe or suggest a database or collection of data and information. One or more embodiments can provide that the database or collection of data and information can be distributed, combined, or augmented, or provided locally and/or remotely (illustrated in FIG. 1).

Figure 4:
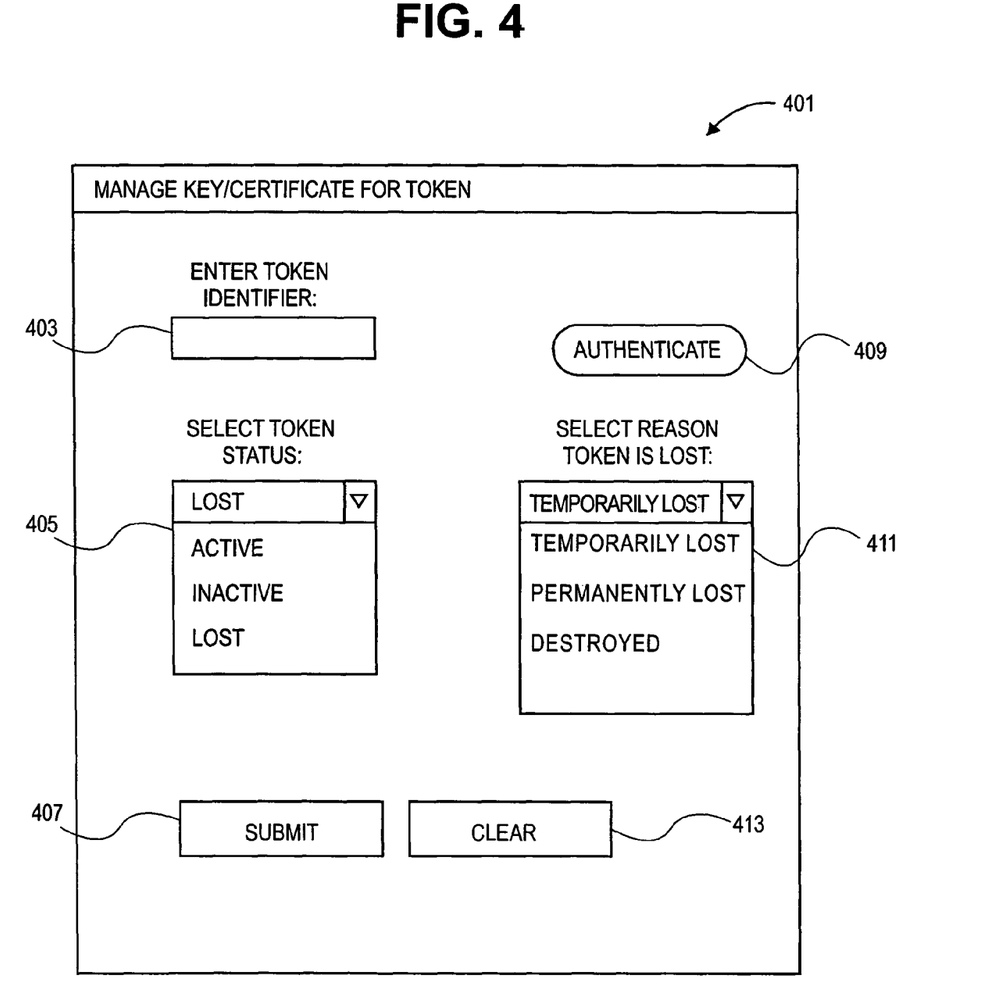
FIG. 4 is a block diagram illustrating a simplified agent interface for managing a subject key and/or certificate for a token.
Figure 5:
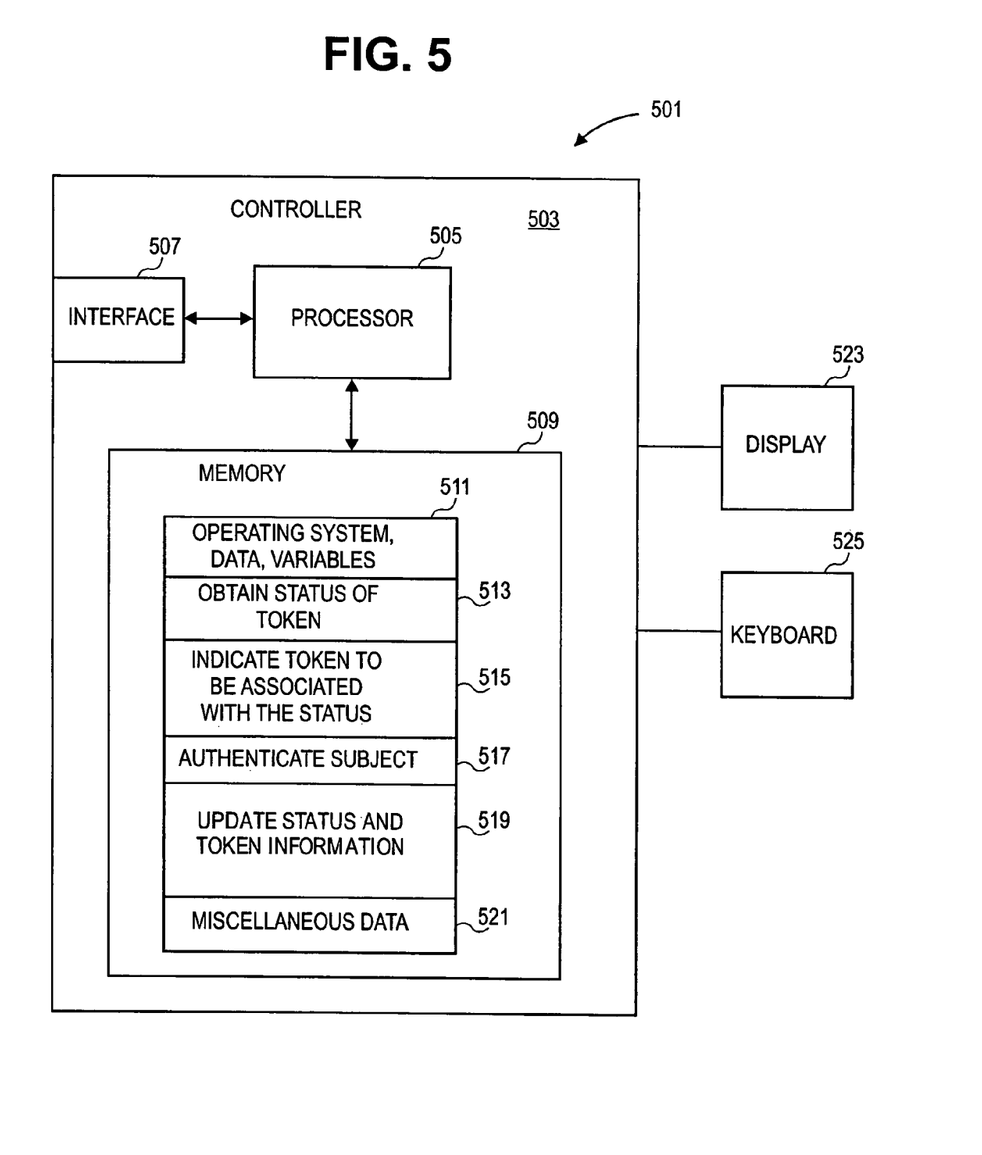
FIG. 5 is a block diagram illustrating portions of an exemplary client for the agent interface.

FIG. 4 and FIG. 5 together illustrate an example agent interface for managing subject keys/certificates for a token. FIG. 4 is an example agent interface, whereas FIG. 5 is a block diagram of the client on which the agent interface can run. Each of these is discussed below.

Referring now to FIG. 4, a block diagram illustrating a simplified agent interface 401 for managing a subject key and/or certificate for a token will be discussed and described. It is assumed that subjects might not be able to utilize their tokens, when reporting that the tokens are lost. Therefore, embodiments can provide for an agent interface, such that an agent and the subject can discuss the issue with the token. The agent can enter the information about the token via the agent interface 401.

In the illustrated agent interface 401, the token identifier 403 can be entered. Alternatively, the token identifier 403 can be ascertained via interaction with the subject, for example specifying identification information (name, address, or the like). The agent can authenticate the subject 409.

Optionally, the agent first can log in (or be authorized) in accordance with known techniques. The illustrated agent interface 401 includes a selection of token status 405. In this example, the token status can be selected from active, inactive, and lost. In response to the token status 405 being indicated as "lost," the agent interface includes a selection of reasons 411 the token is lost. In this example, the reasons can be selected from temporarily lost, permanently lost, and destroyed. Other embodiments can denominate the reasons differently, for example, key compromised and/or on hold. When the interaction is complete, the agent can submit 407 or clear 413. When the agent submits 407, the token identifier, token status, and reasons (if token is lost) can be submitted, for example, by transmission from the client executing the agent interface to the server managing the keys/certificates. The agent can commence updating the token record.

Optionally, a particular subject can have multiple tokens assigned to it, where each token has a unique identifier. If a system permits a subject to have multiple tokens, it may be, desirable to limit the tokens so that only one token per subject has an active status state. In this situation, a token that does not have an active status state can be disallowed. Accordingly, embodiments provide that the token is associated with a unique identifier, and plural tokens can be associated with a particular subject. Embodiments can provide that the plural statuses include an active status state and an inactive status state, wherein only one token associated with a particular subject can have an active status state, further including not allowing use of the token if the token is not in an active status state.

Referring now to FIG. 5, a block diagram illustrating portions of an exemplary client 501 for the agent interface will be discussed and described. The client 501 may include one or more controllers 503, and one or more interfaces, such as the illustrated interface 507. The interface 507 can be utilized in connection with a communication network, for example to connect to another computer. The client 501 can include optional known peripherals for interfacing with a user, such as a display 523 and input devices such as a keyboard 525, keypad, a computer mouse, a touchpad, a touch screen, and/or a trackball. The controller 503 can include a processor 505 and a memory 509. The processor 505 in the client 501 may comprise one or more microprocessors and/or one or more digital signal processors; the memory 509 can be coupled to the processor 505 and may comprise a ROM, a RAM, a PROM, flash memory, and/or an EEPROM. The memory 511 may include multiple memory locations and stores an operating system, data and variables 511; computer programs including those discussed below which can direct the processor 505 in controlling the operation of the client 501; and a location for miscellaneous data 521.

The computer programs can include, for example, obtaining the status of a token 513, indicating the token to be associated with the status 515, authenticating the subject 517, updating the status and token information in the database, and/or other processing. These are described in more detail below.

The client 501 can be programmed for obtaining the status of a token 513. The status that is obtained can be used to replace a current status associated with a token. For example, the client 501 can interact with an agent so that the agent can input a status of "lost", and a further description of the status, such as "lost-key compromised", "lost-destroyed" or similar.

The client 501 can be programmed for indicating the token to be associated with the status 515. For example, the client can interact with the user to indicate a unique identifier associated with the token, or to obtain the token identifier in accordance with other known techniques.

Optionally, the client 501 can be programmed for authenticating the subject 517, in accordance with various known techniques. If the subject does not authenticate, the client 501 can decline to update the status for the token.

The client 510 can be programmed for updating the status and token information in a database 519. Accordingly, an embodiment can provide for managing a subject key and/or certificate for a token, including interacting with a subject to indicate a first status of the plurality of statuses, the statuses including a temporarily lost state, a permanently lost state, and a destroyed state; interacting with the subject to indicate a token to be associated with the first status; and transmitting the first status and an indication of the token to a token processing system. Moreover, an embodiment can include changing the first status to a different status of the plural statuses. Also, an embodiment can include authenticating the subject associated with the token FIG. 6 provides a flow chart for the procedure of recovering the keys and certificates for a token, whereas FIG. 7 provides a flow chart for the procedure of managing the keys and certificates such as in an agent interface.

Figure 6:
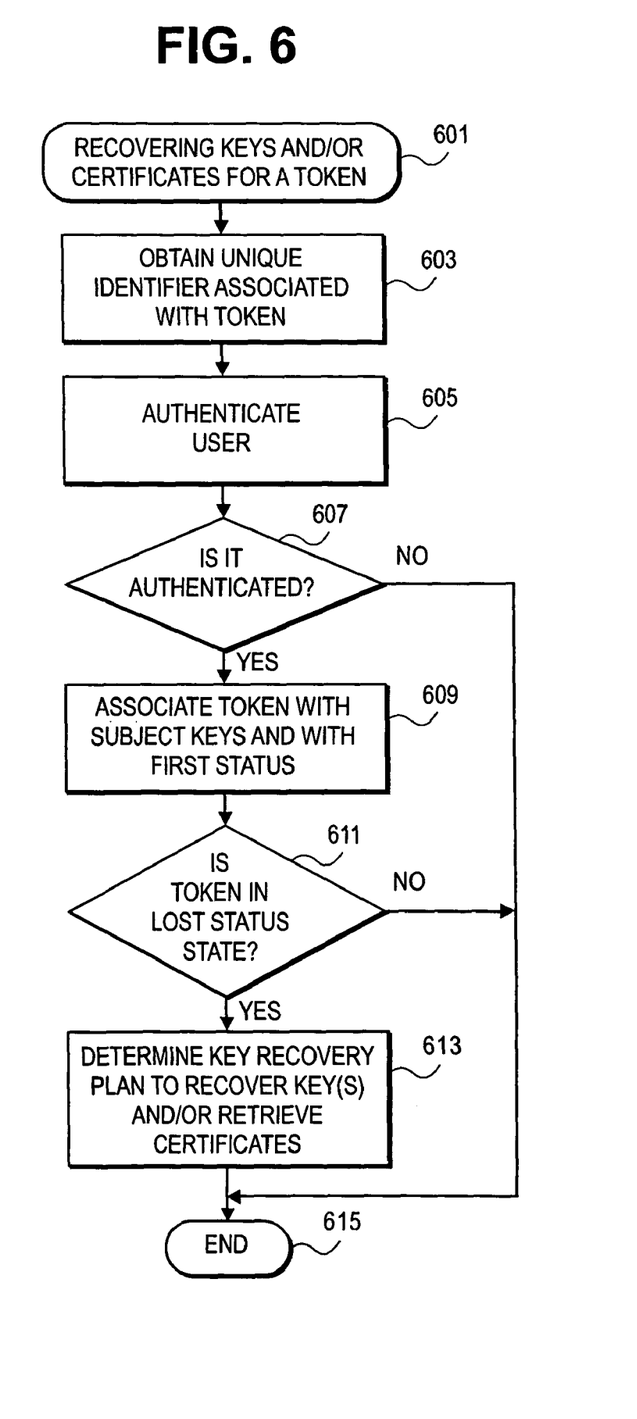
FIG. 6 is a flow chart illustrating an exemplary procedure for recovering keys and/or retrieving certificates for a token.
Figure 7:
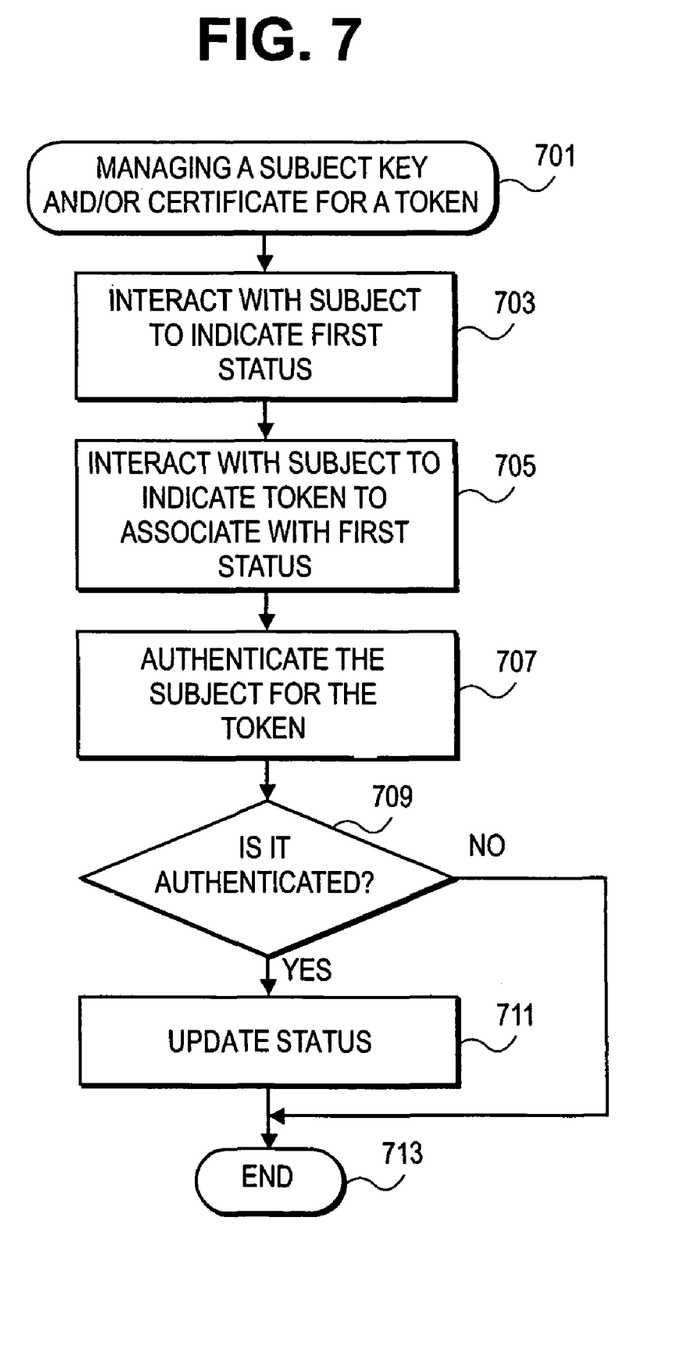
FIG. 7 is a flow chart illustrating an exemplary procedure for managing a subject key and/or certificate for a token.

Referring now to FIG. 6, a flow chart illustrating an exemplary procedure 601 for recovering keys and/or retrieving certificates for a token will be discussed and described. The procedure can advantageously be implemented on, for example, a processor of a server described in connection with FIG. 3 or other apparatus appropriately arranged. Many of the details outlined in FIG. 6 have been previously discussed, and will not be repeated here to avoid obscuring the discussion.

The procedure 601 for recovering keys and/or retrieving certificates can include obtaining 603 a unique identifier associated with the token. Optionally, the subject can be authenticated 605, and if 607 it does not authenticate, the procedure 601 can terminate. Thus, embodiments can provide for authenticating the subject associated with the token, before performing the determining (discussed below for example).

If the subject authenticates, then the procedure 601 can proceed to manage the token in accordance with the status. For example, the procedure 601 can include associating 609 the token with the subject keys and with the first status. The token can be associated with subject keys, for example by being linked in a subject key database. The status can also be associated with the token. Note that the status to be associated with the token can be different from a current status associated with the token. Furthermore, if 611 the token is associated with a "lost" status, then the procedure 601 can provide for determining 613 a key recovery plan to recover the key(s) and/or retrieve the certificate(s) associated with the token. The key recovery plan is discussed elsewhere in more detail. When the key recovery plan is determined, then procedure can end 615.

Accordingly, there can be provided a method of recovering subject keys and/or certificates for a token. The method can include obtaining a unique identifier associated with the token, and associating the token with a plurality of subject keys and with a first status of a plurality of statuses, the statuses including a lost status state and an other status state. Also, the method can include determining, in response to the token being in the lost status state, a key recovery plan to at least one of recover the plurality of subject keys and retrieve the certificates associated with the token.

Referring now to FIG. 7, a flow chart illustrating an exemplary procedure 701 for managing a subject key and/or certificate for a token will be discussed and described. The procedure 701 can advantageously be implemented on, for example, a processor of a client, described in connection with FIG. 5 or other apparatus appropriately arranged. Because many of the details outlined in FIG. 7 have been previously discussed, they will not be repeated below.

The procedure 701 can include interacting 703 with the subject to indicate the first status, that is, at least one status of several statuses, where the statuses include at least a lost status state. Other statuses can include an active status state and/or an inactive status state, or the like.

Also, the procedure 701 can include interacting 705 with the subject to indicate the token to be associated with the first status. The subject can be authenticated 707, and if not authenticated, then the procedure 701 can decline to manage the subject key.

The procedure 701 can also include updating 711 the first status. Then, the procedure can end 713.

Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It should be noted that the term token denotes a small, portable device which typically has an embedded integrated circuit with microprocessor, memory and internal operating system, which stores electronic data and programs, and which is typically utilized for security and/or establishing an identity. Examples of tokens include devices which are sometimes referred to as smartcards, contactless cards, cryptographic tokens, authentication tokens, USB (universal serial bus) tokens, USB keys, USB buttons, and the like, and variants or evolutions thereof. Tokens may transfer data in combination with a wireless protocol, a serial or parallel data transfer protocol such as USB, or variations and evolutions of data transfer protocols. Tokens can operate in connection with standards such as ISO/IEC (International Organization for Standardization/International Electrotechnical Commission) 7816, ISO/IEC 7810, ISO 14443 RFID (radio frequency identification), ISO 15693 RFID, EMV (Europay Mastercard Visa) version 4.00, PC/SC (personal computer/smart card), and/or other standards; custom protocols and definitions; and variants and evolutions thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   storing a key recovery plan associated with a token comprising a plurality of lost status states, wherein each of the plurality of lost status states comprises at least one of a plurality of subject keys, an action to be taken for each of the plurality of subject keys or a token action;
   receiving a unique identifier associated with the token;

identifying at least one of the subject keys associated with the token based on the unique identifier;

receiving an indication that the token was lost and a reason that the token was lost;

selecting, by a hardware processor, a key recovery plan based on the reason that the token was lost, wherein the key recovery plan identifies an action to be taken with the at least one subject key and wherein the action corresponds to the reason that the token was lost, and wherein the action to be taken is to recover at least one prior subject key associated with the same token; and wherein the action further comprises: generating a new subject key and certificate to be associated with the token and managing a certificate associated with the at least one prior subject key.

2. The method of claim 1, wherein the key recovery plan further identifies a subset of the at least one subject key to be recovered and actions to recover the subset.

3. The method of claim 1, wherein the key recovery plan further identifies actions to be performed on information associated with the token.

4. The method of claim 1, further comprising providing the key recovery plan.

5. The method of claim 1, wherein the reason that the token was lost is that the token was destroyed, and wherein the action comprises recovering the at least one subject key.

6. The method of claim 1, wherein the reason that the token was lost is that the token was compromised, and wherein the action comprises:

generating a new subject key to replace the at least one subject key; and revoking a certificate associated with the at least one subject key.

7. The method of claim 1, wherein the reason that the token was lost is that the token is on hold, and wherein the action comprises:

generating a replacement token; and placing the token in an on-hold mode, wherein the replacement token can be self-expiring, and wherein the certificates corresponding to the token are revoked.

8. The method of claim 1, further comprising authenticating a user associated with the token, before performing the determining.

9. An apparatus comprising:

a memory containing instructions; and a hardware processor configured to execute the instructions contained in the memory to:

store a key recovery plan associated with a token comprising a plurality of lost status states, wherein each of the plurality of lost status states comprises at least one of a plurality of subject keys, an action to be taken for each of the plurality of subject keys or a token action;

receive a unique identifier associated with the token;

identify at least one of the subject keys associated with the token based on the unique identifier;

receive an indication that the token was lost and a reason that the token was lost;

select a key recovery plan based on the reason that the token was lost, wherein the key recovery plan identifies an action to be taken with the at least one of the subject keys and wherein the action corresponds to the reason that the token was lost, and wherein the action to be taken is to recover at least one prior subject key associated with the same token; and wherein the action further comprises: generating a new subject key and certificate to be associated with the token and managing a certificate associated with the at least one prior subject key.

10. A non-transitory computer-readable medium comprising instructions for causing the hardware processor to perform a method comprising:

storing a key recovery plan associated with a token comprising a plurality of lost status states, wherein each of the plurality of lost status states comprises at least one of a plurality of subject keys, an action to be taken for each of the plurality of subject keys or a token action;

receiving a unique identifier associated with the token;

identifying at least one of the subject keys associated with the token based on the unique identifier;

receiving an indication that the token was lost and a reason that the token was lost;

selecting, by a hardware processor, a key recovery plan based on the reason that the token was lost, wherein the key recovery plan identifies an action to be taken with the at least one subject key and wherein the action corresponds to the reason that the token was lost, and wherein the action to be taken is to recover at least one prior subject key associated with the same token; and wherein the action further comprises: generating a new subject key and certificate to be associated with the token and managing a certificate associated with the at least one prior subject key.

11. A method comprising:

storing a key recovery plan associated with a token comprising a plurality of lost status states, wherein each of the plurality of lost status states comprises at least one of a plurality of subject keys, an action to be taken for each of the plurality of subject keys or a token action;

receiving an indication that the token was lost and a reason that the token was lost;

selecting, by a hardware processor, an action to be performed for the at least one of the subject keys associated with the token based on the reason that the token was lost;

performing the action for the at least one of the subject keys associated with the token, wherein the action to be taken is to recover at least one prior subject key associated with the same token; and wherein the action further comprises at least one of generating a new subject key and certificate to be associated with the token; and managing a certificate associated with the at least one prior subject key.

12. The method of claim 11, wherein performing the action comprises perform the action on information associated with the token.

13. The method of claim 11, wherein the at least one subject key associated with the token includes at least one of a signing key and an encryption key.

14. The method of claim 11, further comprising:

receiving a new reason that the token is lost; and selecting a new action for the at least one subject key associated with the token based on the new reason that the token is lost.

15. The method of claim 11, further comprising authenticating a user associated with the token, before performing the action.

16. An apparatus comprising:

a memory containing instructions; and a hardware processor configured to execute the instructions contained in the memory to:

store a key recovery plan associated with a token comprising a plurality of lost status states, wherein each of the plurality of lost status states comprises at least one of a plurality of subject keys, an action to be taken for each of the plurality of subject keys or a token action;

receive an indication that the token was lost and a reason that the token was lost;

select an action to be performed for at least one of the subject keys associated with the token based on the reason that the token was lost;

perform the action for the at least one of the subject keys associated with the token, wherein the action to be taken is to recover at least one prior subject key associated with the same token; and wherein the action further comprises at least one of generating a new subject key and certificate to be associated with the token; and managing a certificate associated with the at least one prior subject key.

17. A non-transitory computer-readable medium comprising instructions for causing a hardware processor to perform a method comprising:

storing a key recovery plan associated with a token comprising a plurality of lost status states, wherein each of the plurality of lost status states comprises at least one of a plurality of subject keys, an action to be taken for each of the plurality of subject keys or a token action;

receiving an indication that the token was lost and a reason that the token was lost;

selecting, by a hardware processor, an action to be performed for the at least one of the subject keys associated with the token based on the reason that the token was lost;

performing the action for the at least one of the subject keys associated with the token, wherein the action to be taken is to recover at least one prior subject key associated with the same token; and wherein the action further comprises at least one of generating a new subject key and certificate to be associated with the token; and managing a certificate associated with the at least one prior subject key.

* * * * *